(12) United States Patent
Choi et al.

(10) Patent No.: US 10,071,922 B2
(45) Date of Patent: Sep. 11, 2018

(54) CAPACITIVE DEIONIZATION APPARATUS AND METHOD FOR MANUFACTURING THE SAME

(71) Applicant: DOOSAN HEAVY INDUSTRIES & CONSTRUCTION CO., LTD., Changwon-si, Gyeongsangnam-do (KR)

(72) Inventors: Hyun Sung Choi, Busan (KR); Seok Ho Choi, Anyang-si (KR); Su Hyun Hwang, Seoul (KR); Wonjoon Choi, Suwon-si (KR); Seongju Kim, Jinju-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 226 days.

(21) Appl. No.: 15/075,840

(22) Filed: Mar. 21, 2016

(65) Prior Publication Data

US 2016/0326025 A1     Nov. 10, 2016

(30) Foreign Application Priority Data

May 4, 2015 (KR) .......................... 10-2015-0062547
Sep. 2, 2015 (KR) .......................... 10-2015-0124339

(51) Int. Cl.
*B01D 15/02* (2006.01)
*B01D 61/48* (2006.01)
(Continued)

(52) U.S. Cl.
CPC ............ *C02F 1/4691* (2013.01); *B01D 15/02* (2013.01); *B01D 61/44* (2013.01); *B01D 61/48* (2013.01);
(Continued)

(58) Field of Classification Search
CPC .............................. C02F 1/469; C02F 1/4691
See application file for complete search history.

(56) References Cited

U.S. PATENT DOCUMENTS 6,312,577 B1    11/2001    Ganzi et al.
9,067,811 B1 *   6/2015    Bennett ................... C02F 1/469
(Continued)

FOREIGN PATENT DOCUMENTS

KR    10-0521628 B2    10/2005
KR    10-1004707 B1    12/2010
(Continued)

OTHER PUBLICATIONS

Konstantinos Dermentzis et al., "Continuous capacitive deionization-electrodialysis reversal through electrostatic shielding for desalination and deionization of water", Electrochimica Acta, Elsevier Science Publishers, vol. 53, No. 24, Oct. 15, 2008, pp. 7123-7130, XP023438208.

(Continued)

*Primary Examiner* — Brian W Cohen
(74) *Attorney, Agent, or Firm* — Sughrue Mion, PLLC

(57) ABSTRACT

Provided is a capacitive deionization apparatus and a method for manufacturing the same, which capacitive deionization apparatus is enhanced in the removal efficiency for ionic substances and the fluid throughput, hence applicable to water with high salt concentration such as sea water, etc., and easy to manufacture.

5 Claims, 13 Drawing Sheets

(51) Int. Cl.
    *C02F 1/469* (2006.01)
    *B01D 69/02* (2006.01)
    *B01D 61/44* (2006.01)
    *C02F 103/08* (2006.01)
    *C02F 1/461* (2006.01)

(52) U.S. Cl.
    CPC ........ *B01D 69/02* (2013.01); *B01D 2215/021* (2013.01); *B01D 2252/10* (2013.01); *B01D 2325/42* (2013.01); *C02F 2001/46138* (2013.01); *C02F 2001/46161* (2013.01); *C02F 2103/08* (2013.01); *C02F 2201/46* (2013.01); *C02F 2201/46115* (2013.01)

(56) References Cited

U.S. PATENT DOCUMENTS

| | | | |
|---|---|---|---|
| 2012/0186980 | A1 | 7/2012 | Ramaprabhu et al. |
| 2013/0153426 | A1 | 6/2013 | Sun et al. |
| 2013/0168097 | A1 | 7/2013 | Janssen et al. |
| 2013/0209916 | A1* | 8/2013 | Kim .............. H01G 9/038 429/499 |
| 2014/0246318 | A1 | 9/2014 | Yang et al. |
| 2015/0315043 | A1* | 11/2015 | Servida ............ C02F 1/46114 204/536 |
| 2016/0229717 | A1* | 8/2016 | Servida ............ C25B 9/20 |

FOREIGN PATENT DOCUMENTS

| | | |
|---|---|---|
| KR | 10-2012-0015964 A | 2/2012 |
| KR | 10-2012-0030834 A | 3/2012 |
| KR | 10-1207463 B | 11/2012 |
| KR | 10-1227853 B2 | 1/2013 |
| KR | 10-1410642 B1 | 6/2014 |
| KR | 10-1442530 B2 | 9/2014 |
| KR | 10-2014-0119545 A | 10/2014 |
| KR | 10-2015-0002364 A | 1/2015 |
| KR | 2015-008348 A | 1/2015 |
| KR | 2015-0074244 A | 7/2015 |

OTHER PUBLICATIONS

Communication dated Oct. 6, 2017, from European Patent Office in counterpart application No. 17188076.8.
Korean Office Action dated Jun. 21, 2016, issued in corresponding Korean Patent Application No. 10-2015-00062547.
Korean Office Action dated Jan. 20, 2017, issued in corresponding Korean Patent Application No. 10-2015-0124339.
Korean Notice of Allowance dated Feb. 17, 2017, issued in corresponding Korean Patent Application No. 10-20150062547.
European Search Report dated Sep. 16, 2016, issued in corresponding European Application No. 16159655.6.
Wang et al., Three-dimensional macroporous graphene architectures as high performance electrodes for capacitive deionization, J. Mater. Chem. A, 2013, 1, 117778-11789, The Royal Society of Chemistry 2013.

* cited by examiner

CAPACITIVE DEIONIZATION APPARATUS AND METHOD FOR MANUFACTURING THE SAME

CROSS-REFERENCE TO RELATED APPLICATIONS

This application claims priority from Korean Application No. 10-2015-0062547, filed May 4, 2015 and Korean Application No. 10-2015-0124339, filed Sep. 2, 2015, the disclosures of which are incorporated herein by reference in their entireties.

BACKGROUND

1. Field

Apparatuses and methods consistent with exemplary embodiments relate to a capacitive deionization apparatus and a method for manufacturing the same, which capacitive deionization apparatus is enhanced in the removal efficiency for ionic substances and the fluid throughput, hence applicable to water with high salt concentration such as sea water, etc., and easy to manufacture.

2. Description of the Related Art

Capacitive deionization (CDI) is a technology directed to removing water of ionic substances by using the adsorption and desorption of ions in the electric double layer (EDL) formed at a charged electrode interface.

FIG. 1 is a diagram showing the principle of the CDI technique, illustrating the process of ion adsorption and desorption on the surface of charged electrodes. Referring to FIG. 1, upon applying a voltage at a potential difference range that does not incur electrolysis of water, the electrodes are charged with a defined quantity of electric charges. As a stream of brine water containing ions flows through the charged electrodes, the counter-ions having the opposite charge sign to the one in the charged electrodes move to each electrode by the electrostatic force and become adsorbed from the water onto the surface of the electrodes, and the water passing through the electrodes turns to desalinated water that is free from ions.

In this regard, the quantity of ions adsorbed onto the electrodes depends on the capacitance of the electrodes in use. Thus, the electrodes as used in the CDI are generally porous carbon electrodes with a large specific surface area.

When the electrodes are saturated with the ions beyond their adsorption capacity, the electrodes cannot adsorb ions anymore and the ions of the influent stream become stuck in the effluent stream. In order to release the ions adsorbed by the electrodes, a short-circuit potential or an opposite electric potential to the adsorption one is applied to the electrodes. This causes the electrodes to lose electric charges or get counter charges, and the adsorbed ions are rapidly released from the electrodes, leading to a regeneration of the electrodes.

In this manner, the CDI technique is very easy to operate, for the technique involves adsorption and desorption of ions triggered merely by changing the electric potential of the electrodes. Further, the CDI causes no emission of environmental pollutants during the deionization, so it is thus known as an eco-friendly deionization process. As an example of the improved CDI, the membrane capacitive deionization (MCDI) device includes an ion exchange membrane formed on the surface of the electrodes in order to increase the selectivity for ions to adsorb.

However, the CDI or MCDI electrodes of the related art, which are made up of a stationary active material (e.g., activated carbon, carbon fiber, carbon aerogel, etc.), have a limitation in the ion adsorption performance. In order to secure a large adsorption capacity, it is necessary to expand the electrodes to a large area or to stack multiple electrodes. However, the above-described expansion of the electrodes can cause a great increase in the costs for the manufacture and operation of the related equipment in need.

Accordingly, many attempts have been made to use a novel material with high ion adsorption performance as an electrode material. Such methods, however, not only require a complicated process for the manufacture of electrodes but also have a limitation in maximizing the surface area of the novel material due to formability, density, etc.

In the CDI or MCDI of the related art, it is common to design the flow channel so narrow as much as about 100 μm in order to increase the deionization efficiency. Such a narrow flow channel is susceptible to heavy fouling, reducing the water throughput and deteriorating the productivity. Further, the narrow flow channel makes it difficult to make a serial capacitive deionization (CDI) module with large area, leading to a limitation in raising the productivity.

Particularly, when increasing the water throughput for the sake of commercialization in the CDI or MCDI of the related art, it is necessary to assemble a plurality of unit cells required to realize a defined capacity. This can deteriorate the productivity and also increase the volume of the apparatus, causing a limitation in the mobility of the apparatus. In addition, the capacitive deionization (CDI) apparatus of the related art possibly causes the channeling effect on the surface of the electrodes in the stack depending on the influent and effluent positions of the fluid and thus deteriorates the ion removal efficiency.

SUMMARY

One or more exemplary embodiments provide a capacitive deionization apparatus and a method for manufacturing the same, where the capacitive deionization apparatus is available to have high capacity, applicable to water with high salt concentration and easy to manufacture.

One or more exemplary embodiments also provide a capacitive deionization apparatus and a method for manufacturing the same, where the capacitive deionization apparatus is simplified in the construction and capable of realizing optimum energy efficiency.

In accordance with an aspect of an exemplary embodiment, there is provided a capacitive deionization apparatus, which has a feed solution passing between a pair of electrodes to remove ionic substances from the feed solution through adsorption by the electrostatic force, the capacitive deionization apparatus including: graphene contained in an electrode material or an electrode active material; or a cation exchange resin and an anion exchange resin mixed together and put into a flow channel between the electrodes without an ion exchange membrane.

In an exemplary embodiment, the capacitive deionization apparatus may further include an ion exchange membrane arranged between the electrodes to let ions pass through in a selective manner, and a mesh-like graphene may be put between the electrodes and the ion exchange membrane.

In an exemplary embodiment, the capacitive deionization apparatus may further include an ion exchange membrane arranged between the electrodes to let ions pass through in a selective manner, and a graphene slurry may continuously flow in the flow channel between the electrodes and the ion exchange membrane to remove ionic substances from the feed solution by adsorption.

In accordance with an aspect of another exemplary embodiment, there is provided a continuous operation method of capacitive deionization apparatuses. a single unit of the capacitive deionization apparatus or a set of multiple capacitive deionization apparatuses may be in operation. Further, the individual capacitive deionization apparatuses constituting the set may be operated according to a different operating schedule from one another to perform a charging and discharging in an alternate manner, thereby achieving a continuous desalinization of the influent solution.

In an exemplary embodiment, the set may consist of two capacitive deionization apparatuses, as illustrated in FIG. 5, where the two capacitive deionization apparatuses perform a charging and a discharging in an alternate manner so that the graphene slurry circulates between the two capacitive deionization apparatuses to realize a successive operation of the two capacitive deionization apparatuses.

In an exemplary embodiment, the capacitive deionization apparatus may include a pair of first electrodes; and a pair of second electrodes being arranged between the first electrodes and having a graphene deposition layer formed on the surface of the flow channel having the feed solution flowing therein.

In an exemplary embodiment, an active slurry may be put between the first and second electrodes. The first electrode or the second electrode may be a porous electrode.

In an exemplary embodiment, the active slurry may be a carbon slurry, a graphene slurry, or a conductive nanoparticle slurry.

In an exemplary embodiment, the charging and discharging of the first and second electrodes may be performed in a simultaneous or alternate manner.

In an exemplary embodiment, the thickness of the flow channel formed between the electrodes may be in the range of 0.2 mm to 10 mm.

In an exemplary embodiment, the cation exchange resin and the anion exchange resin put into the flow channel between the electrodes may have an opposite concentration gradient to each other. The cation exchange resin may be mostly distributed on the side of a cathode, and the anion exchange resin may be mostly distributed on the side of an anode.

In an exemplary embodiment, the cation exchange resin and the anion exchange resin may be distributed uniformly in the center of the flow channel.

In an exemplary embodiment, the capacitive deionization apparatus may be constructed as a serial capacitive deionization apparatus that includes an ion exchange resin and an electrode sequentially stacked between a pair of electrodes, with a voltage applied to the whole electrodes. The cation exchange resin and the anion exchange resin may be mixed together and put into each flow channel between the adjacent electrodes without an ion exchange membrane.

In an exemplary embodiment, the thickness of the flow channel formed between the electrodes may be in the range of 0.2 mm to 10 mm.

In an exemplary embodiment, the cation exchange resin and the anion exchange resin put into the flow channel between the adjacent electrodes may have an opposite concentration gradient to each other. The cation exchange resin may be mostly distributed on the side of a cathode, and the anion exchange resin may be mostly distributed on the side of an anode.

In an exemplary embodiment, the cation exchange resin and the anion exchange resin between the adjacent electrodes may be distributed uniformly in the center of the flow channel.

In accordance with an aspect of another exemplary embodiment, there is provided a capacitive deionization apparatus including: a pair of electrodes between which a feed solution passes through to remove ionic substances from the feed solution through adsorption by electrostatic force; and graphene or a cation exchange resin and an anion exchange resin mixed together, the cation and the anion exchange resins provided in a flow channel between the pair of electrodes.

The capacitive deionization apparatus may further include an ion exchange membrane arranged between the pair of electrodes, wherein mesh-like graphene is provided between a first electrode of the pair electrodes and an ion exchange membrane.

The capacitive deionization apparatus may further include an ion exchange membrane arranged between the pair of electrodes, wherein a graphene slurry continuously flows in the flow channel between a first electrode of the electrodes and an ion exchange membrane to remove the ionic substances from the feed solution through the adsorption.

A continuous operation method of capacitive deionization apparatuses, the method including: providing a plurality of capacitive deionization apparatuses as a set, wherein the plurality of capacitive deionization apparatuses constituting the set are configured to operate according to a different operating schedule from one another to perform a charging and discharging in an alternate manner, thereby achieving a continuous desalinization of an influent solution.

The set may include two capacitive deionization apparatuses, wherein the two capacitive deionization apparatuses perform a charging and a discharging in an alternate manner so that graphene slurry circulates between the two capacitive deionization apparatuses.

The pair of electrodes may include: a pair of first electrodes; and a pair of second electrodes being arranged between the pair of first electrodes and comprising a graphene deposition layer formed on a surface of the flow channel having the feed solution flowing therein.

An active slurry may be provided between the first and the second electrodes.

One of the first electrodes or one of the second electrodes may be a porous electrode.

The active slurry may include a carbon slurry, a graphene slurry, or a conductive nanoparticle slurry.

The first and the second electrodes may be configured to charge and discharge in a simultaneous or alternate manner from each other.

A thickness of the flow channel formed between the pair of electrodes may be in a range between 0.2 mm and 10 mm.

The cation exchange resin and the anion exchange resin provided into the flow channel between the pair of electrodes may have an opposite concentration gradient from each other.

The cation exchange resin may be provided on a cathode side, and the anion exchange resin is provided on an anode side.

The cation exchange resin and the anion exchange resin may be distributed uniformly in a center portion of the flow channel.

The capacitive deionization apparatus may include a serial capacitive deionization apparatus comprising an ion exchange resin and an electrode sequentially stacked between a pair of electrodes, with a voltage applied to the pair of electrodes, wherein the cation exchange resin and the anion exchange resin are mixed together and provided in each flow channel between the adjacent electrodes.

The graphene may be contained in an electrode material or an electrode active material.

The capacitive deionization apparatus of the present disclosure introduces a graphene material with high-efficiency adsorption performance in a variety of forms to the electrodes or uses an ion exchange resin put in the flow channels. This makes it easy to construct the apparatus with large capacity and renders the apparatus applicable to water with high salt concentration. Further, the capacitive deionization apparatus of the present disclosure can increase the size of the flow channels to minimize the fouling effect and promote the water throughput and also enhance the deionization efficiency to reduce the CAPEX cost.

The advantageous effects of the present disclosure are not limited to the above-mentioned effects and may be construed to include all the effects deducible from the construction of the present disclosure as disclosed in the detailed description or the claims of the present disclosure.

Figure 1:
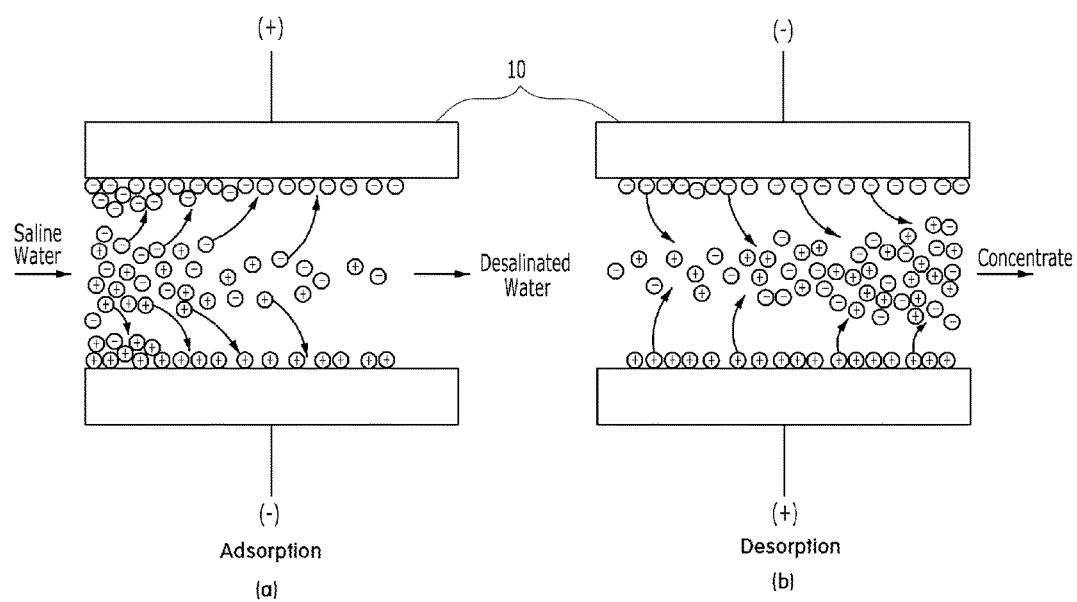
FIG. 1 is a diagram illustrating the principle of the capacitive deionization (CDI) technique.

| Description of Reference Numerals Used in the Drawings | |
|---|---|
| 10: Electrode | 11: First electrode |
| 12: Second electrode | 22: Mesh-like graphene |
| 23: Graphene slurry | 30: Ion exchange membrane |
| 30a: Cation exchange membrane | |
| 30b: Anion exchange membrane | |
| 40: Active slurry | 50: Ion exchange resin |
| 51: Cation exchange resin | 52: Anion exchange resin |

DETAILED DESCRIPTION

Reference will now be made in detail to exemplary embodiments of the disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

In accordance with an exemplary embodiment of the present disclosure, there is provided a capacitive deionization apparatus that has a feed solution flowing between a pair of electrodes 10 to remove ionic substances from the feed solution by adsorption, where the capacitive deionization apparatus uses graphene as an electrode material or an electrode active material in order to enhance the adsorption performance of the electrodes 10. Hereinafter, a detailed description will be given as to the embodiment of the present disclosure with reference to the accompanying drawings.

Graphene, a thin film-like nano-scale material made up of carbon atoms arranged in the form of a honeycomb lattice, can enhance the ion adsorption performance of CDI electrodes due to its high porosity. But, using graphene in the manufacture of CDI electrodes requires many processes and high cost in forming the graphene of a defined shape and density of a defined level or above.

For this reason, the exemplary embodiment of the present disclosure involves forming a graphene deposition layer on the surface of an electrode. The graphene deposition layer may be produced by different methods, including mechanical or chemical exfoliation of graphite, epitaxial growth on a silicone carbide substrate, chemical vapor deposition on a transition metal catalyst layer, or the like.

The chemical vapor deposition (CVD) for graphene synthesis is a method which includes heating a metal thin film at high temperature in the hydrocarbon atmosphere for pyrolysis of a hydrocarbon gas, melting the decomposed carbon atoms into the metal thin film and then performing a cooling to cause segregation of supersaturated carbon atoms on the surface of the metal thin film and thereby to create a graphene layer on the metal thin film.

Figure 2:
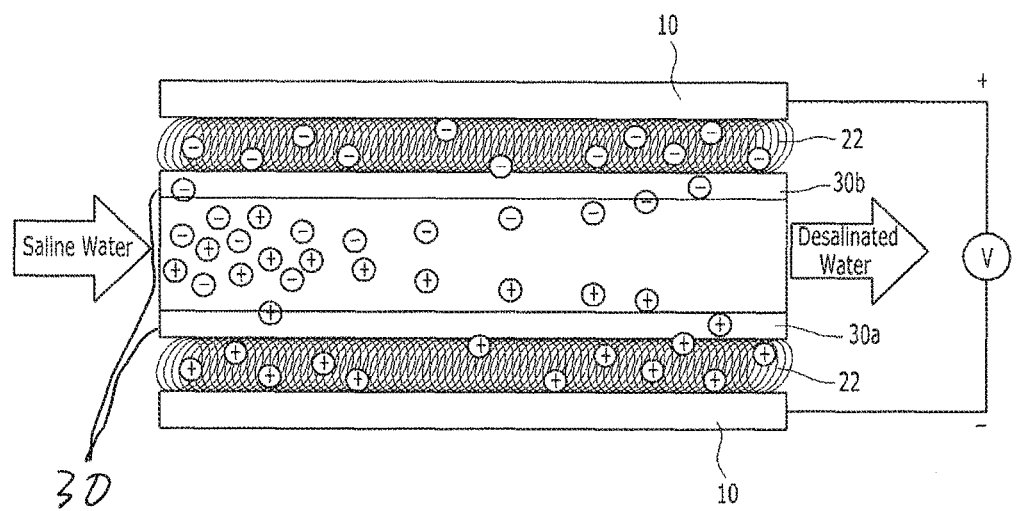
FIGS. 2 and 3 are conceptual schemes showing the construction and the operating mechanism of a capacitive deionization apparatus using a mesh-like graphene in accordance with one embodiment of the present disclosure.
Figure 3:
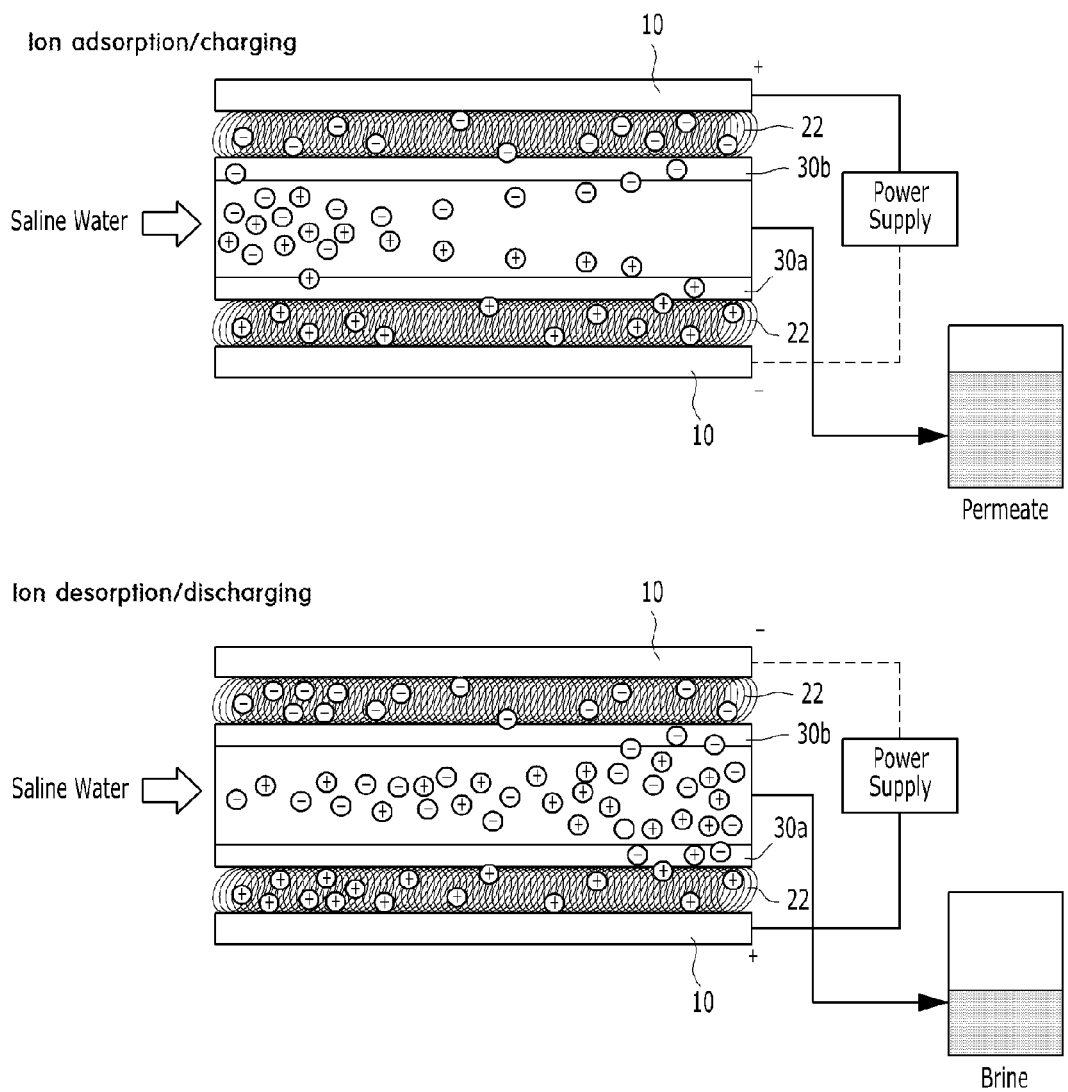

In accordance with an exemplary embodiment of the present disclosure, there is provided a capacitive deionization apparatus that includes, as shown in FIGS. 2 and 3, an ion exchange membrane 30 arranged between a pair of the electrodes 10 to let ions pass through in a selective manner, where a mesh-like graphene 22 may be put between the electrode 10 and the ion exchange membrane 30. As shown in FIGS. 2 and 3, the ion exchange membrane 30 may include a cation exchange membrane 30a and an anion exchange membrane 30b. Hereinafter, the cation and the anion exchange membranes 30a and 30b will be simply referred as the ion exchange membrane 30.

For this, the capacitive deionization apparatus of the present disclosure may further include a metal thin film between the electrode 10 and the graphene deposition layer 20 (See FIGS. 6 and 7), or construct the electrode 10 using a metal layer. In addition, an ion exchange membrane 30 used to enhance the selectivity of ions adsorbed onto the surface of the electrode may be employed under necessity or omitted.

The mesh-like graphene 22 provided between the electrode 10 and the ion exchange membrane 30 may use the existing electrode to enhance the ion adsorption performance. The electrode 10 and the ion exchange membrane 30 may be connected to each other to reduce the electric resistance between the electrode and the membrane. The mesh-like graphene 22 is prepared by different methods and capable of realizing the larger surface area and the higher ion adsorption performance than the thin film-type graphene.

Figure 4:
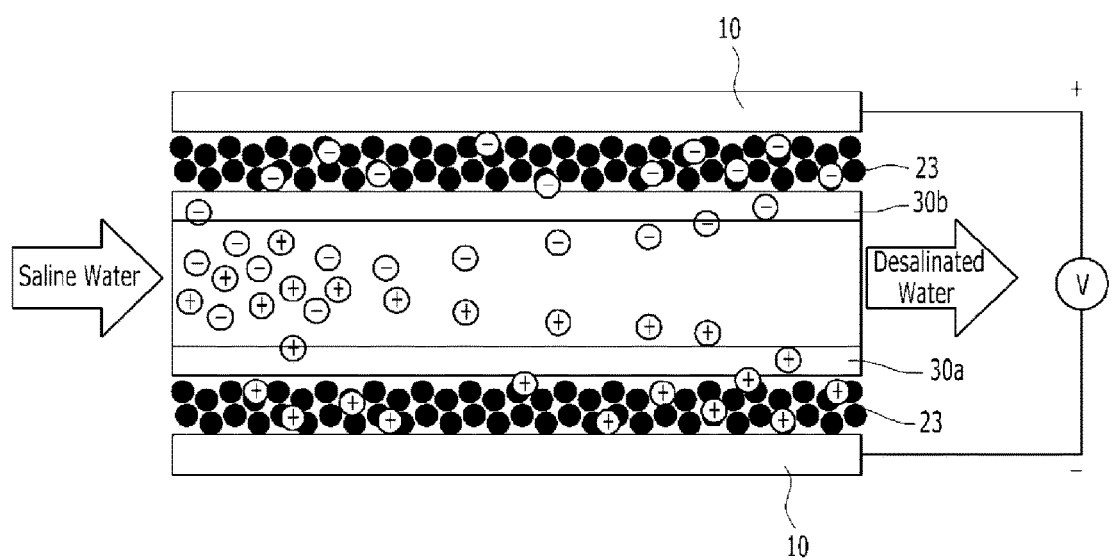
FIGS. 4 and 5 are conceptual schemes showing the construction and the operating mechanism of a capacitive deionization apparatus using a graphene slurry in accordance with one embodiment of the present disclosure.
Figure 5:
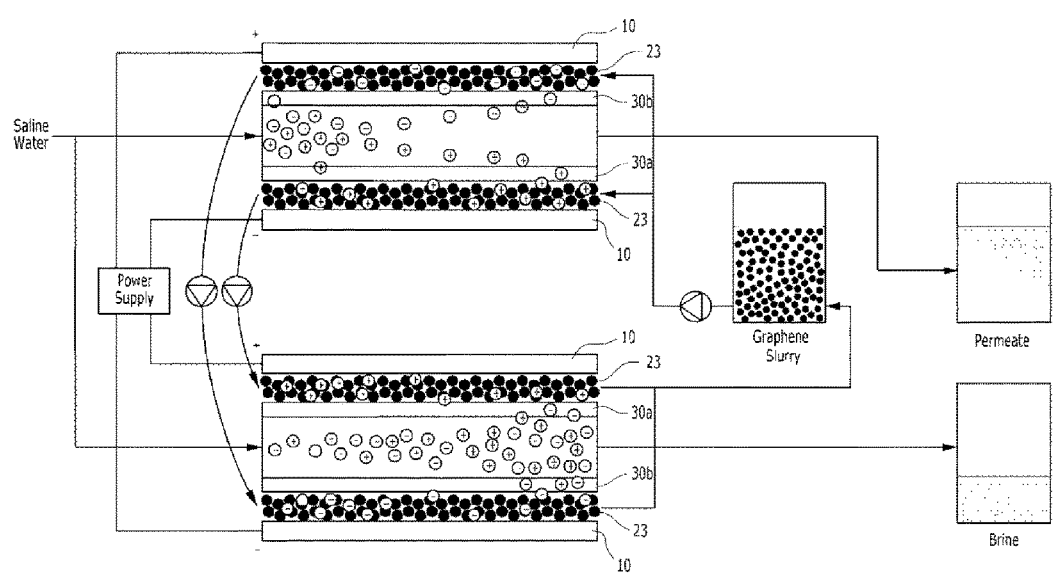

In accordance with an exemplary embodiment of the present disclosure, there is provided a capacitive deionization apparatus that includes, as shown in FIGS. 4 and 5, an ion exchange membrane 30 (including a cation exchange membrane 30a and an anion exchange membrane 30b) arranged between a pair of the electrodes 10 to let ions pass through in a selective manner; and a graphene slurry 23 may continuously flow in the flow channel provided between the electrodes 10 and the ion exchange membrane 30 to remove ionic substances from the feed solution by adsorption.

The electrodes 10 and the ion exchange membrane 30 form a flow channel in which the graphene slurry 23 flows, so the graphene can flow in the flow channel while fluidized as a mixture with an electrolyte or the like.

In the related art, the electrode material or the electrode active material is immobilized, so it needs to increase the size of the electrode in order to secure a capacity required to a charging/discharging. However, when using the graphene slurry 23 as in the exemplary embodiment of the present disclosure, the electrode active material can be supplied continuously, making it possible to freely change the design of the apparatus according to the use purpose without a limitation in the size or space.

As a continuous supply of the graphene slurry 23 is secured, the width of the flow channel between the electrode 10 and the ion exchange membrane 30 can be changed without a limitation due to the size. Also, the charging/discharging efficiency can be enhanced simply by changing the fluid velocity of the graphene slurry 23 or imposing a limit on the width ratio of a flow channel for active material to a flow channel for feed solution.

On the other hand, a single unit of the capacitive deionization apparatus or a set of multiple capacitive deionization apparatuses may be in operation. Further, the individual capacitive deionization apparatuses constituting the set may be operated according to a different operating schedule from one another to perform a charging and discharging in an alternate manner, thereby achieving a continuous desalinization of the influent solution.

In a specific exemplary embodiment, the set may consist of two capacitive deionization apparatuses, as illustrated in FIG. 5, where the two capacitive deionization apparatuses perform a charging and a discharging in an alternate manner so that the graphene slurry 23 circulates between the two capacitive deionization apparatuses to realize a successive operation of the two capacitive deionization apparatuses.

Figure 6:
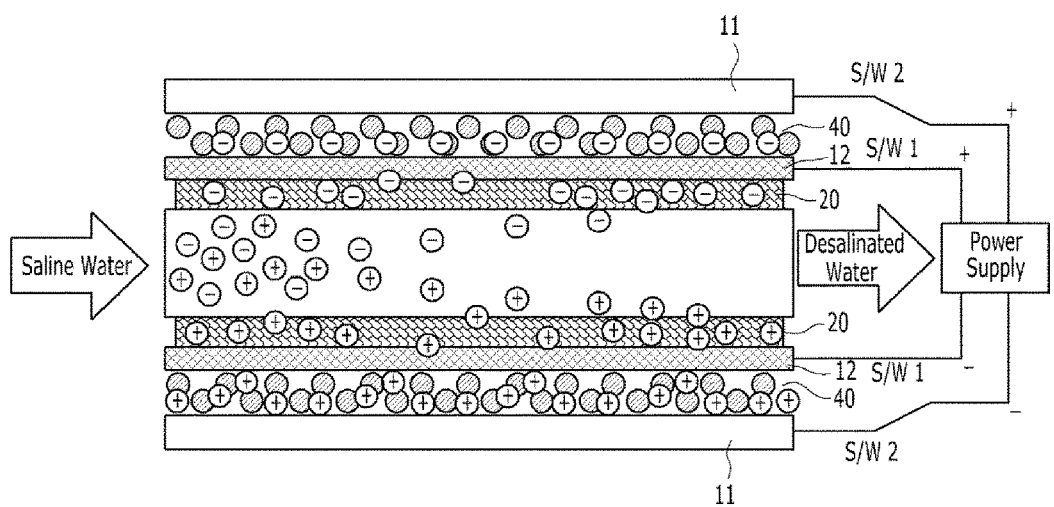
FIGS. 6 and 7 are conceptual schemes showing the construction and the operating mechanism of a capacitive deionization apparatus using two types of electrodes in accordance with one embodiment of the present disclosure.
Figure 7:
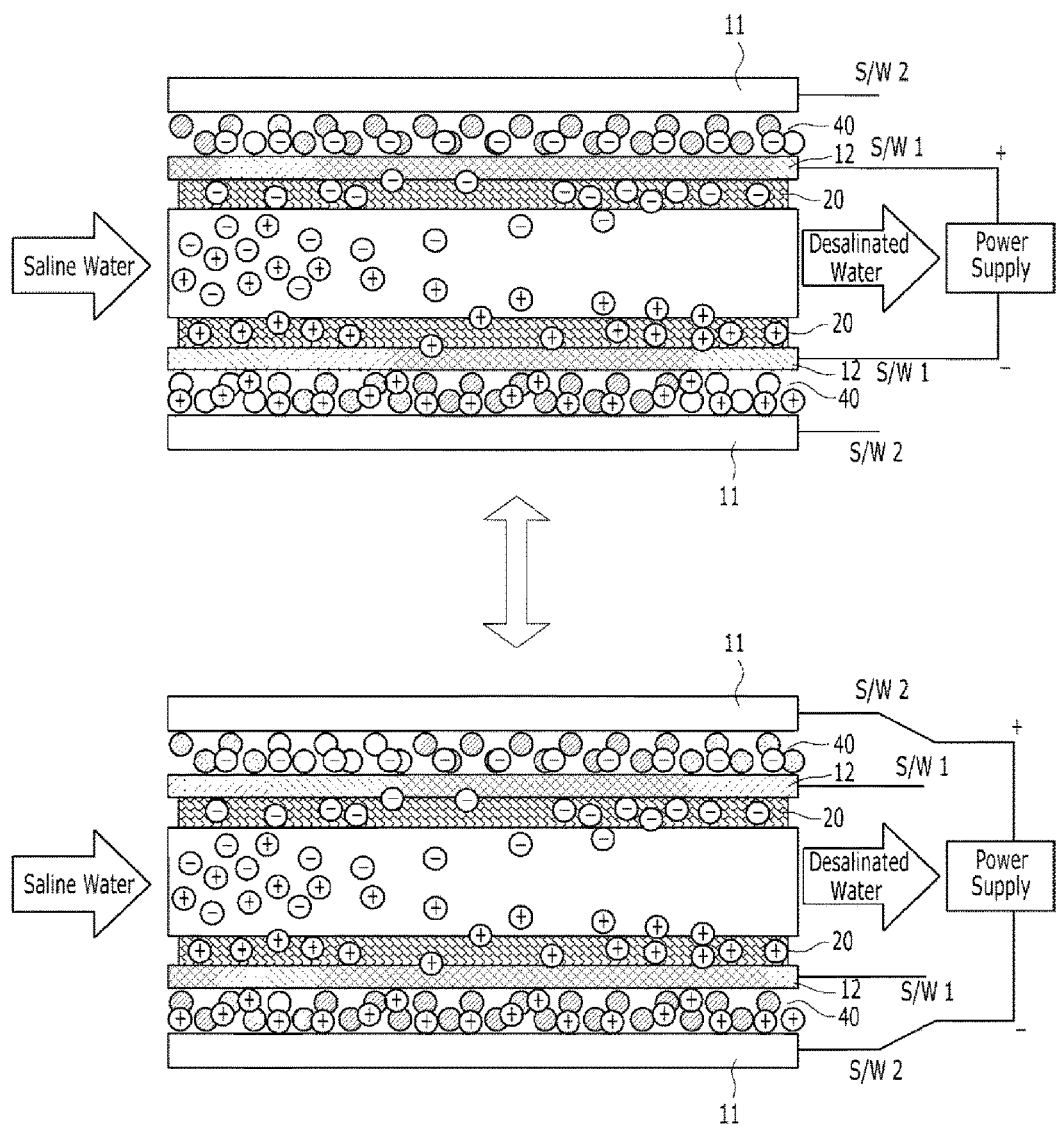

In accordance with further another exemplary embodiment of the present disclosure, there is provided a capacitive deionization apparatus that includes, as shown in FIGS. 6 and 7, a pair of first electrodes 11; and a pair of second electrodes 12 having a graphene deposition layer 20 formed on the surface of the flow channel having the feed solution flowing therein. The second electrodes 12 are arranged between the first electrodes 11, and an active slurry 40 is put between the first and second electrodes 11 and 12.

In the exemplary embodiment, two different pairs of electrodes are used in order to maximize the surface area and the absorption performance. To describe the process in detail, the ionic substances included in the feed solution are adsorbed onto the second electrodes 12 on which the graphene deposition layer 20 is formed. Passing through the second electrodes 12, the adsorbed ionic substances move to the first electrodes 11 and become adsorbed onto the first electrodes 11. In this regard, the second electrodes 12 are preferably porous electrodes so that the ionic substances are allowed to pass through the second electrodes.

The active slurry 40 made up of an electrode active material is put between the first electrode 11 and the second electrode 12 to further enhance the ion adsorption capacity. In this case, the active slurry 40 also serves to connect the first electrode 11 and the second electrode 12 together and reduce the electric resistance between the electrodes. The active slurry 40 may be selected from various materials capable of acting as an electrode active material. In an exemplary embodiment, the active slurry may be a carbon slurry, a graphene slurry, or a conductive nanoparticle slurry.

Further, the charging and discharging of the first and second electrodes 11 and 12 may be performed in a simultaneous or alternate manner under necessary, as shown in FIGS. 6 and 7.

The above-described exemplary embodiments introduce a graphene material with high efficiency and high adsorption capacity in different forms to the existing electrodes, making it possible to realize a CDI apparatus easy to make with large capacity and applicable to water with high salt concentration.

In accordance with further an exemplary embodiment of the present disclosure, there is provided a capacitive deionization apparatus that has a feed solution flowing between a pair of electrodes 10 to remove ionic substances from the feed solution by adsorption, where a cation exchange resin 51 and an anion exchange resin 52 are mixed together and put into the flow channel between the electrodes 10 in order to enhance the removal efficiency of the ionic substances. Hereinafter, a detailed description will be given as to the exemplary embodiment of the present disclosure with reference to the accompanying drawings.

Figure 8:
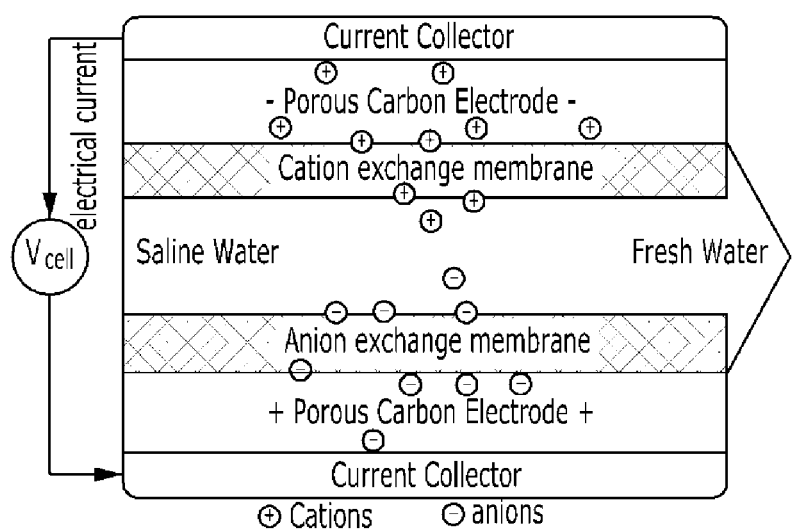
FIG. 8 is a conceptual scheme showing the construction and the operating mechanism of a conventional MCDI apparatus.

The CDI or MCDI of the related art is generally designed to provide an ion exchange membrane and design the flow channel so narrow as much as about 100 μm, as shown in FIG. 8, in order to increase the deionization efficiency. But, in the CDI or MCDI of the related art, such a narrow flow channel is likely to cause the fouling effect and reduce the water throughput. Further, the whole system comes to a halt when the narrow flow channel is plugged up, making it difficult to make a large-area serial CDI module and thus leading to a limitation to enhance the productivity in desalination of water on large scale.

In order to maintain the deionization efficiency and solve the problems in association with the fouling effect and the reduced water throughput, the present disclosure can reduce the electric resistance in the flow channel by increasing the size of the flow channel and also filling the flow channel with the cation exchange resin 51 and the anion exchange resin 52 to function as a bridge.

In other words, the capacitive deionization apparatus of the present disclosure increases the size of the flow channel to reduce the fouling effect and increase the throughput of water and also uses the cation exchange resin 51 and the anion exchange resin 52 put into the flow channel to raise the deionization efficiency and enhance the salt removal rate during the desalination.

In addition, the capacitive deionization apparatus of the present disclosure uses an ion exchange resin, which is relatively cheap, so it can dramatically reduce the CAPEX cost by eliminating the need of using an expensive ion exchange membrane that is used to enhance the deionization efficiency in the capacitive deionization apparatus of the related art.

In this regard, the thickness of the flow channel formed between the electrodes 10 can be changed in a wide range under necessary and is preferably in the range of 0.2 mm to 10 mm in order to reduce the fouling effect and increase the water throughput. When the flow channel is too thin, it is likely to cause problems such as the fouling effect or the like as in the capacitive deionization apparatus of the related art. When the flow channel is too thick, it leads to deterioration in the deionization efficiency.

Figure 9:
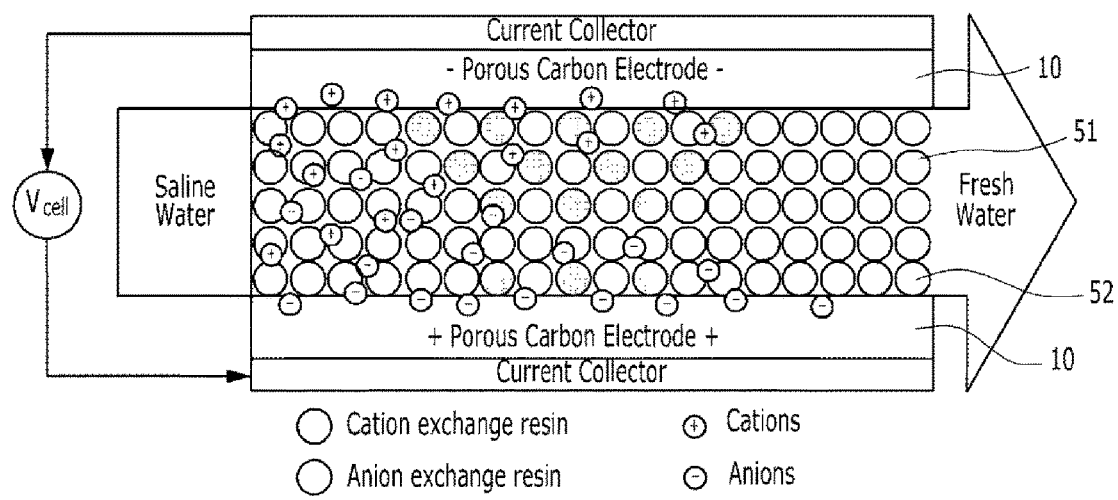
FIGS. 9 and 10 are conceptual schemes showing the construction and the operating mechanism of a capacitive deionization apparatus having flow channels filled with an ion exchange resin in accordance with one embodiment of the present disclosure.

The cation exchange resin 51 and the anion exchange resin 52 put into the flow channel between the electrodes 10 may be uniformly mixed together, as shown in FIG. 9. Alternatively, the cation exchange resin 51 and the anion exchange resin 52 may have an opposite concentration gradient to each other in order to further enhance the deionization efficiency.

Figure 10:
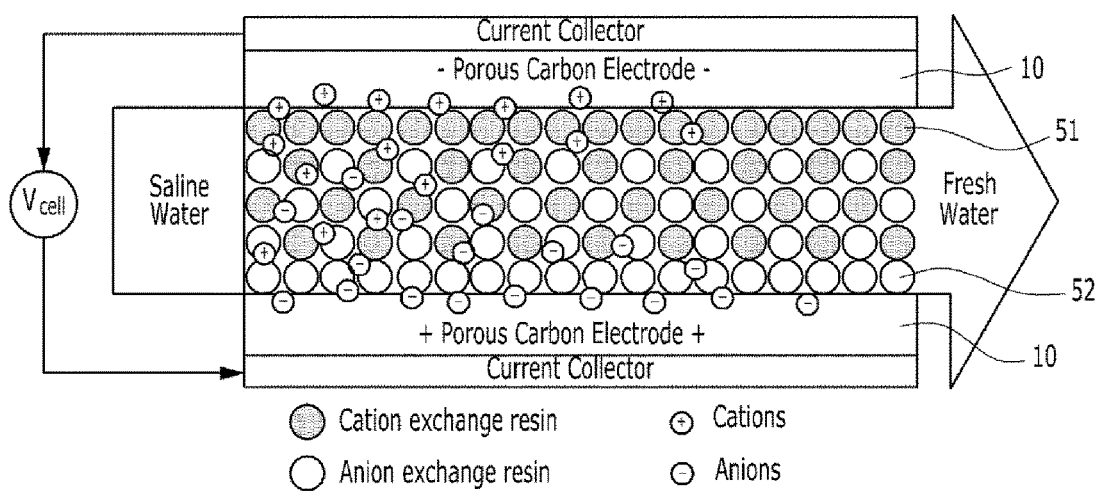

More specifically, as shown in FIG. 10, the cation exchange resin 51 is mostly distributed on the side of the cathode rather than the anode, whereas the anion exchange resin 52 is mostly distributed on the side of the anode rather than the cathode. This not only maximizes the adsorption efficiency in each electrode but also helps the desorbed ions released rapidly by the ion exchange resin and the flux when the power is off. Preferably, the cation exchange resin 51 and the anion exchange resin 52 are distributed uniformly in the center of the flow channel.

By expanding the flow channel in the capacitive deionization apparatus of the present disclosure, it is possible to manufacture a serial capacitive deionization apparatus that is difficult to realize in the prior art due to the narrow flow channel.

Figure 11:
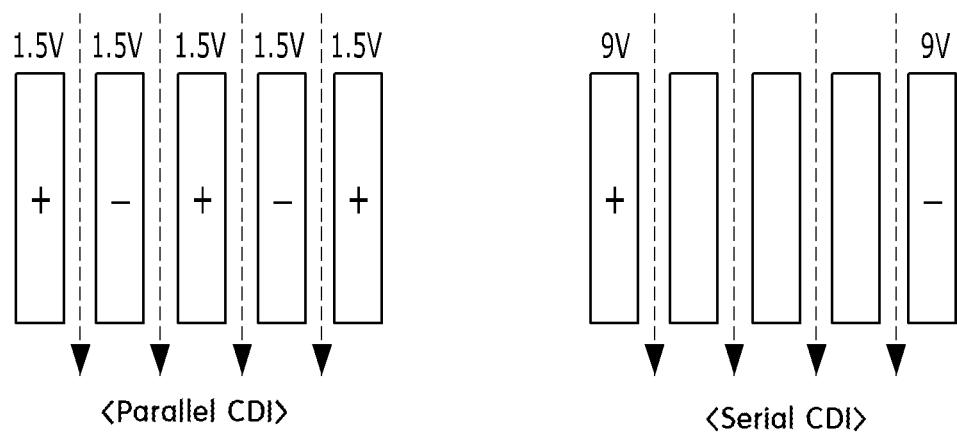
FIGS. 11 and 12 are conceptual schemes showing the construction and the operating mechanism of parallel and serial CDI systems.
Figure 12:
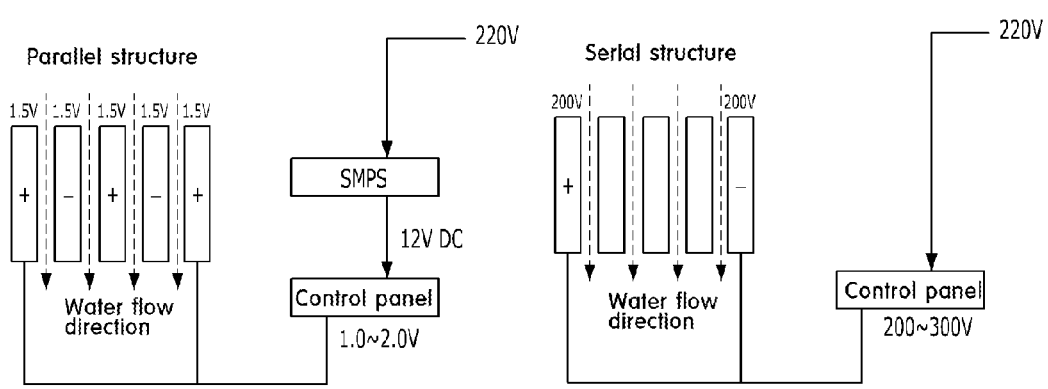

As illustrated in FIGS. 11 and 12, a parallel capacitive deionization apparatus has a high-voltage, high-current structure that divides a voltage a little at a time into the individual cells. The parallel capacitive deionization apparatus has a high removal efficiency but a short removal time. In contrast, a serial capacitive deionization apparatus has a high-voltage, low-current structure that applies a voltage to the entire electrodes. The serial capacitive deionization apparatus has a low initial removal efficiency but a long removal time and secures a reduced cost and high energy efficiency in association with the size-expansion of the module.

In addition, the serial capacitive deionization apparatus takes over the parallel CDI module in terms of price competition, for it uses a power supply and a control system relatively cheap and requires no SMPS (Switching Mode Power Supply).

In the capacitive deionization apparatus of the related art, the whole system comes to a halt upon the narrow flow channel plugged up, making it difficult to make a large-area serial CDI module.

Figure 13:
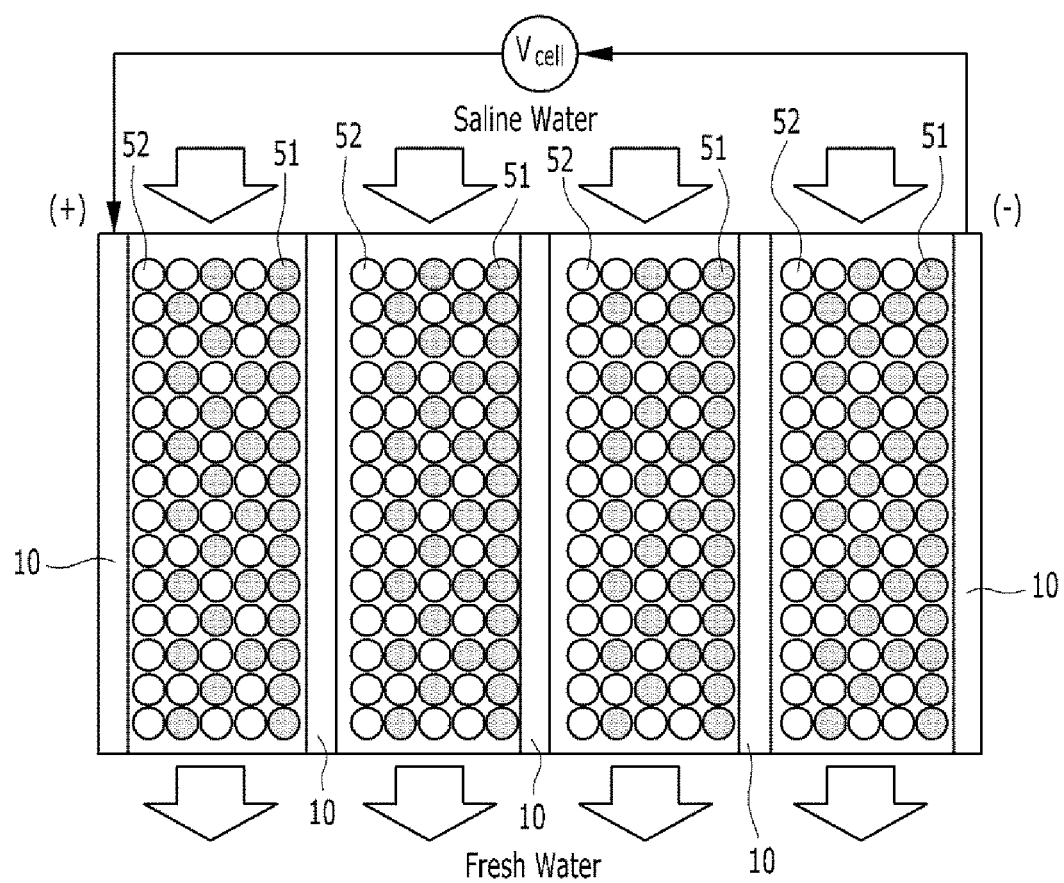
FIG. 13 is a conceptual scheme showing the construction and the operating mechanism of a serial capacitive deionization apparatus having flow channels filled with an ion exchange resin in accordance with one embodiment of the present disclosure.

The present disclosure can realize a large-area serial capacitive deionization apparatus by expanding the flow channel and filling it with an ion exchange resin. More specifically, the serial capacitive deionization apparatus of the present disclosure includes an electrode 10 and an ion exchange resin 50 sequentially stacked as shown in FIG. 13, so that a voltage is applied to the whole electrodes, and a cation exchange resin 51 and an anion exchange resin 52 are mixed together and put into each flow channel between the adjacent electrodes 10. This structure can achieve desalination of water on large area and large scale without plugging up the flow channels.

In this regard, the thickness of the flow channel formed between the electrodes 10 can be changed in a wide range under necessary and is preferably in the range of 0.2 mm to 10 mm in order to reduce the fouling effect and increase the water throughput. When the flow channel is too thin, it is likely to cause problems such as the fouling effect or the like as in the capacitive deionization apparatus of the related art. When the flow channel is too thick, it leads to a deterioration in the deionization efficiency.

The cation exchange resin 51 and the anion exchange resin 52 put into the flow channel between the electrodes 10 may be uniformly mixed together. Alternatively, the cation exchange resin 51 and the anion exchange resin 52 may have an opposite concentration gradient to each other in order to further enhance the deionization efficiency as described above.

More specifically, as shown in FIG. 13, the cation exchange resin 51 is mostly distributed on the side of the cathode rather than the anode, whereas the anion exchange resin 52 is mostly distributed on the side of the anode rather than the cathode. This not only maximizes the adsorption efficiency in each electrode but also helps the desorbed ions released rapidly by the ion exchange resin and the flux when the power is off. Preferably, the cation exchange resin 51 and the anion exchange resin 52 are distributed uniformly in the center of the flow channel.

The above-described embodiments can realize a CDI apparatus designed to minimize the fouling effect and increase the water throughput with enhanced removal efficiency for ionic substances.

In accordance with still further another embodiment of the present disclosure, there is provided a deionization system that includes: a serial capacitive deionization apparatus of the present disclosure; a water tank for feeding water to the serial capacitive deionization apparatus; a power supply for supplying power to the first and second electrodes of the serial capacitive deionization apparatus; and a deionized water tank for storing deionized water from the serial capacity deionization apparatus.

Further, the embodiments discussed have been presented by way of example only and not limitation. Thus, the breadth and scope of the disclosure(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the disclosure(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any disclosure(s) in this disclosure. Neither is the "Brief Summary" to be considered as a characterization of the disclosure(s) set forth in the claims found herein. Furthermore, any reference in this disclosure to "disclosure" in the singular should not be used to argue that there is only a single point of novelty claimed in this disclosure. Multiple disclosures may be set forth according to the limitations of the multiple claims associated with this disclosure, and the claims accordingly define the disclosure(s), and their equivalents, that are protected thereby. In all instances, the scope of the claims shall be considered on their own merits in light of the specification, but should not be constrained by the headings set forth herein.

What is claimed is:

1. A capacitive deionization apparatus comprising:
a pair of electrodes between which a feed solution passes through to remove ionic substances from the feed solution through adsorption by electrostatic force; and
graphene or a cation exchange resin and an anion exchange resin mixed together, the cation and the anion exchange resins provided in a flow channel between the pair of electrodes;
wherein the pair of electrodes comprises:
a pair of first electrodes; and
a pair of second electrodes being arranged between the pair of first electrodes and comprising a graphene deposition layer formed on a surface of at least one surface of the pair of second electrodes having the feed solution flowing therein, and
wherein an active slurry is provided between the first and second electrodes.

2. The capacitive deionization apparatus as claimed in claim 1, wherein one of the first electrodes or one of the second electrodes is a porous electrode.

3. The capacitive deionization apparatus as claimed in claim 1, wherein the active slurry comprises a carbon slurry, a graphene slurry, or a conductive nanoparticle slurry.

4. The capacitive deionization apparatus as claimed in claim 1, wherein the first and the second electrodes are configured to charge and discharge in a simultaneous or alternate manner from each other.

5. The capacitive deionization apparatus as claimed in claim 1, wherein a thickness of the flow channel formed between the pair of electrodes is in a range between 0.2 mm and 10 mm.

* * * * *